United States Patent

Johnson et al.

[11] 3,919,306
[45] Nov. 11, 1975

[54] PURIFICATION OF RECIRCULATED STREAM FOR ISOPHTHALIC ACID PRODUCTION

[75] Inventors: Carl E. Johnson, Blackwood, N.J.; Alan D. Baker, White Plains, N.Y.

[73] Assignee: Atlantic Richfield Company, Los Angeles, Calif.

[22] Filed: June 5, 1972

[21] Appl. No.: 259,829

Related U.S. Application Data

[63] Continuation-in-part of Ser. No. 38,341, May 18, 1970, abandoned, which is a continuation-in-part of Ser. No. 727,840, May 9, 1968, abandoned.

[52] U.S. Cl. ........................................... 260/524 R
[51] Int. Cl.² ........................................ C07C 51/33
[58] Field of Search ............................. 260/524 R

[56] References Cited
UNITED STATES PATENTS

| | | | |
|---|---|---|---|
| 2,865,708 | 12/1958 | Dinsmore et al. | 260/524 |
| 3,170,768 | 2/1965 | Baldwin | 260/524 R |

*Primary Examiner*—James A. Patten
*Assistant Examiner*—Richard D. Kelly
*Attorney, Agent, or Firm*—John R. Ewbank

[57] ABSTRACT

Technical grades of meta xylene employed in manufacturing isophthalic acid generally contain very small amounts of ortho and/or para xylene, leading to the formation of troublesome amounts of orthophthalic acid and terephthalic acid, which are troublesome in the cayalytic oxidation of meta xylene to isophthalic acid in an oxidative reaction zone. The recirculated acetic acid solvent tends to accumulate contaminants such as orthophthalic acid, terephthalic acid, and related impurities. There is the possibility of contamination of the isophthalic acid product by terephthalic acid, benzoic acid, and/or other impurities. Even small amounts of orthophthalic acid are extremely harmful because orthophthalic acid is a catalyst poison. Any troublesome accumulation of contaminants is prevented by the unique combination of steps for purification of the recycled stream. All of the orthophthalic acid (catalyst poison) is removed as the sodium salt in an aqueous filtrate after a precipitate comprising cobalt carbonate has been filtered from a mixture of aqueous sodium carbonate and a stripped bottoms solution. Cobalt acetate is regenerated from the cobalt carbonate precipitate by reaction with a portion of the overhead stream from the flash distillation of the stream from which the isophthalic acid has been removed. Water is desirably removed from the acetic acid prior to its recirculation to the oxidative reaction zone. Only small proportions of make up cobalt acetate and/or make up acetic acid must be added to the recirculated solution because of the high efficiency of the purification of the acetic acid solvent and the high efficiency of the purification of the cobalt acetate catalyst and the satisfactory removal of orthophthalic acid related catalyst poisons from the purified cobalt catalyst.

2 Claims, 1 Drawing Figure

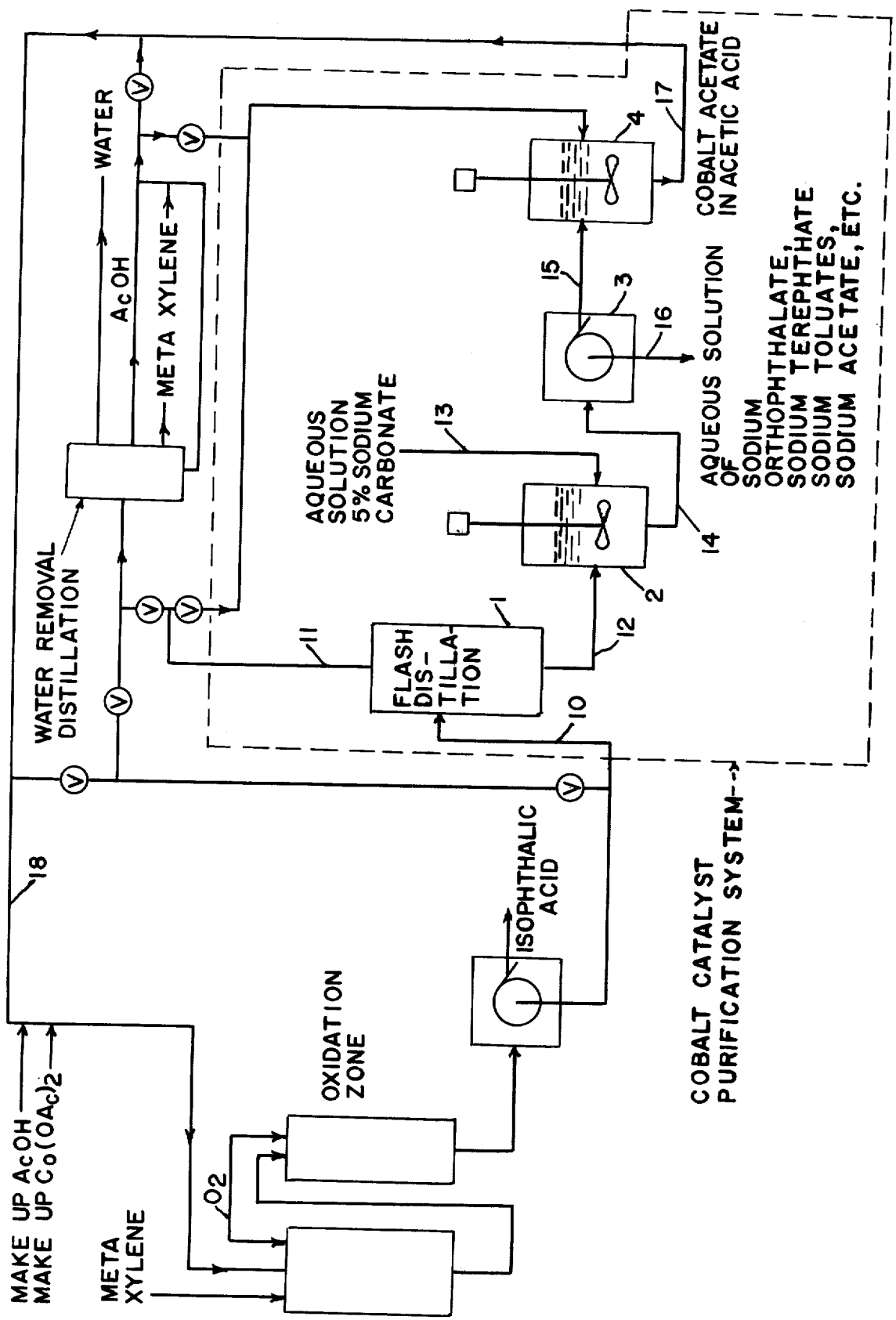

3,919,306

PURIFICATION OF RECIRCULATED STREAM FOR ISOPHTHALIC ACID PRODUCTION

NOTATION OF RELATED APPLICATIONS

This application is a continuation-in-part of copending application Ser. No. 38,341 filed May 18, 1970, which was a continuation-in-part of Parent Ser. No. 727,840 filed May 9, 1968, each of said ancestor applications, now abandoned, being deemed here reiterated.

BACKGROUND OF INVENTION

1. FIELD OF INVENTION

This invention relates to a method for the manufacture of a selected isomer of a dicarboxylic mononuclear aromatic acid and the prevention of the accumulation of by-product acids and related impurities which tend to accumulate by reason of the recirculation of solvent and catalyst, and particularly the removal from the recirculated stream of minor amounts of the undesired isomers and related impurities and especially to the removal of orthophthalic acid, a poison seriously deactivating the catalyst.

2. PRIOR ART

For some purposes there has been a grouping together of literature pertinent to the three methods for making each of the three phthalic acids from the corresponding xylene by oxidation. Terephthalic acid or isophthalic acid may be prepared in a reasonably dry acetic acid solvent in the presence of dissolved cobalt acetate as a catalyst. Some of the impurities which can be present in the crude reaction product include water, unreacted xylene, monocarboxylic acids and undesired isomeric phthalic acids. After the filtration of the desired phthalic acid, the acetic acid solvent contains the catalyst and the secondary reaction products. Minor amounts of such secondary reaction products are inevitably formed in the oxidation of xylene by any of the known methods. The particular amount and type of these materials depends upon the incidence of the precursors in the xylene feedstock and upon the conditions of the oxidation reaction. In a feedstock of any isomer of xylene, such as meta xylene, there are inevitably minor, but appreciable amounts of other isomers, such as ortho-xylene and para-xylene and ethyl-benzene, and smaller amounts of other impurities such as paraffins, naphthenes and nitrogen-and sulfur-containing compounds.

In any system in which a significant portion of a reactant stream is recycled, there is a propensity for certain impurities to accumulate. Because the concentration of contaminants in a stream may be very small, significant difficulty is encountered in achieving inexpensively the type of purification of the recycled stream which can remove the small amounts of impurities to prevent the accumulation of the impurities at a cost appropriate in the manufacture of a chemical having a price as low as the various phthalic acids have had. Removal of water from the depleted solution has been one of the important features for purifying the recirculated stream comprising acetic acid. There have been proposals for purifying the cobalt by burning all of the orthophthalic and/or other organic acid contaminant to provide a cobalt oxide ash, and this invention is an improvement over the cobalt oxide ash approach. Moreover, during periods when the price of certain of the isomers of phthalic acid have been going down, the price of the cobalt components for the catalyst has been going up, thus magnifying the difficulties of the purification of the recycled streams for phthalic acid manufacture. Although initially chemists tended to group together the three methods for making the three species of phthalic acids from the corresponding three sylenes, engineers concerned with design and operation of plants increasingly recognized the uniqueness and specificity of the three methods, and particularly the method of preparing isophthalic acid from metaxylene.

SUMMARY OF THE INVENTION

In accordance with the present invention, the crude reaction product is filtered to recover isophthalic acid, and the crude filtrate solution is directed to the system for purification of the recirculated stream. Either a portion or all of the filtrate is flash distilled to recover a significant portion of the acetic acid solvent, leaving a stripped bottoms liquid stream comprising acetic acid, water, toluic acid, benzoic acid, terephthalic acid, orthophthalic acid, related secondary products, related contaminant compounds, miscellaneous impurities, and the cobalt acetate catalyst. Such stripped bottoms solution is treated with an aqueous solution of sodium carbonate to form a precipitate containing cobalt carbonate, such precipitate being completely free from cobalt orthophthalate, the troublesome catalyst poison. Such precipitate containing cobalt carbonate is recovered by filtration. Of particular importance, the aqueous filtrate contains sodium orthophthalate, sodium terephthalate, sodium benzoate, and other derivatives of impurities which might contaminate the product if allowed to accumulate excessively through recirculation. The filtrate contains sodium toluate, and sodium acetate, the loss of which is a part of the cost of purification. At some stage, water is removed from the acid scheduled for recirculation. Either all or a part of the solution containing cobalt acetate is subjected to the cobalt acetate purification, and the acetic acid solution of purified cobalt acetate is recombined with any stream bypassing the cobalt purification. The purified dried solvent containing the recirculated cobalt acetate is mixed with make up aqueous acetic acid, and with a small amount of make up cobalt acetate, and employed as the solution of cobalt acetate in acetic acid solvent directed to the metaxylene oxidation zone.

BRIEF DESCRIPTION OF THE DRAWING

The drawing is a self-explanatory flow sheet of the process.

GENERAL DESCRIPTION OF PROCESS

With reference to the flow sheet, a reaction zone contains acetic acid solvent supplied predominantly as a recirculated solution, there being only small amounts of make up acetic acid and make up cobalt catalyst. In the reaction zone, metaxylene and oxygen are supplied to the acetic acid solution so that isophthalic acid is formed from the meta xylene. A stream of reaction product comprising the acetic acid solvent, the isophthalic acid, the cobalt acetate catalyst and various by products of the reaction flows from the reaction zone. Isophthalic acid is separated from the product stream in apparatus such as a chilled rotary filter, providing a filtrate stream from which the isophthalic acid has been depleted. A suitable portion (all or a part, depending in part upon purity of the feed) of the depleted stream enters the cobalt purification system comprising a flash distillation zone 1 through line 10. All of the volatile components are removed as an overhead stream from the flash distillation zone. This overhead stream will include substantially all (e.g. 85–95%) of the acetic acid, a significant portion of the water, and whatever other volatile components may be in the product stream, including any unreacted meta xylene. The overhead stream can be directed through line 11 together with whatever by-passes the cobalt purification system toward a solvent purification system comprising a distillation unit in which water is removed from the acetic acid. It is generally desirable to salvage and recycle any meta xylene which happens to reach the tower for the removal of water by fractional distillation. The water removal step can be thought of as a partial drying of the acetic acid and may be scheduled at any of several alternative possibilities subsequent to leaving the flash distillation zone and prior to the circulation of the stream to the zone for the oxidation of meta xylene.

Particular attention is directed to the stream in line 12 from the stripped bottoms from the flash distillation zone 1. This stripped bottoms stream contain water and acetic acid, together with the non-volatile components such as certain aromatic organic acids including benzoic acid, toluic acids, orthophthalic acid and terephthalic acid. Orthophthalic acid is a poison for the step of oxidation of meta xylene. Other acids such as benzoic acid can contaminate the product if the accumulation is excessive. The stripped bottoms stream contain sufficient acetic acid to solubilize the cobalt acetate.

Various purification steps can be conducted for the removal of contaminants from the stripped bottoms stream without departing from the significance of the step of purification of the cobalt component by controlled formation of a precipitate containing cobalt carbonate in precipitation zone 2. The purification may involve one or more steps of filtration with appropriate recycling. For example, if any suspended matter is in the bottoms stream, it can be filtered and separated without interfering with the subsequent step of forming a precipitate containing cobalt carbonate. The flow sheet shows a precipitate containing cobalt carbonate. The cobalt-containing precipitate is generally a hydrated mixture of the basic cobalt carbonate and cobaltous carbonate. The basic cobalt carbonate is a hydrate of a mixture of cobalt hydroxide and cobalt carbonate.

As shown in the flow sheet, an aqueous solution containing about 5% sodium carbonate flows through line 13 for mixing with the stream derived from the stripped bottoms stream 12 in precipitation zone 2. This mixing should be conducted at an elevated temperature, desirably above about 175°F. The final proportions of sodium carbonate in the mixture represents a stoichiometric excess over the sodium carbonate needed for the neutralization of all of the acetic acid, orthophthalic acid, terephthalic acid, benzoic acid, and toluic acid, the amount of excess sodium carbonate being generally at least about 10%. Thus the mixture has an alkaline pH tending to assure solubility of the sodium orthophthalate, sodium terephthalate, sodium benzoate, sodium toluates and/or other contaminants. In neutralizing the relatively large proportion of acetic acid and contaminant acids, the sodium carbonate provides a great excess of carbonate ion for the precipitation of the cobalt content of the bottoms stream 12.

Because the reaction between the aqueous sodium carbonate and the acetic acid solution is conducted at the temperature above about 175°F, the precipitate comprising the basic cobalt carbonate is filterable with moderate ease. Instead of filtration, the precipitate can be recovered by centrifuging or other appropriate equivalents of filtration. The slurry of precipitate flows by stream 14 to rotary filtering zone 3. The filtered precipitate is washed with water to remove sodium compounds. The washed precipitate contains cobalt as the only significant metal component, with any contaminating metals such as sodium present only in very small amounts.

The washed precipitate contains significant amounts of water, and can be handled in the hydrate condition, thus adding water to the acetic acid solution during the regeneration of the cobalt acetate. The washed solid precipitate containing cobalt carbonate is removed from filtering zone 3 and passed by line 15 to a regeneration zone 4. The precipitate is contacted with acetic acid and sufficient water (the water content of line 11 from zone 1 being used if appropriate) to react with the carbonate salt, thus generating carbon dioxide which escapes from the solution, and forming cobalt acetate in the solution in regeneration zone 4. The solution of cobalt acetate in acetic acid is directed by line 17 to a zone in which the water is distilled from the acetic acid and/or blended with partially dried acetic acid to provide purified recirculated stream 18. The recirculated stream 18 consisting of the partially dried acetic acid, and cobalt acetate is mixed with make up acetic acid and with make up cobalt acetate and directed toward the principal reaction zone (oxidation zone) in which the meta xylene is oxidized to isophthalic acid. It should be noted that the process does not require either unduly costly amounts of cobalt acetate for make up or unduly costly amounts of acetic acid for the make up of the recirculated solution.

DESCRIPTION OF PREFERRED EMBODIMENTS

The invention is further clarified by reference to a plurality of examples.

EXAMPLES 1–8

A m-xylene feed was oxidized to isophthalic acid with a cobalt acetate catalyst in an acetic acid medium. The oxidate was cooled to crystallize the isophthalic acid product and filtered. The filtrate corresponded to the composition designated as Filtrate A in Table I. A second oxidation with a different feed produced a filtrate which had a composition represented as Filtrate B in Table I.

TABLE I

| Filtrate Compositions Investigated | | |
|---|---|---|
| Component | Filtrate A, Wt. % | Filtrate B, Wt. % |
| o-Phthalic Acid (OPA) | 1.00 | 1.00 |
| Benzoic Acid (BzA) | 2.00 | 0.30 |
| m-Toluic Acid (MTA) | 1.00 | 1.00 |
| Cobaltous Acetate (Co(OAc)2) | 2.25 | 2.25 |
| Isophthalic Acid (IPA) | 0.56 | 0.35 |
| Terephthalic Acid (TPA) | 0.044 | 0.022 |
| Acetic Acid (HOAc) | 88.1 | 90.1 |
| $H_2O$ | 5.0 | 5.0 |
| | 100.0 | 100.0 |

The two filtrates of Table I were each treated to recover catalytically-active cobalt suited for recycle to the oxidation reaction. Recovery was effected by flashing the filtrate to remove water and about 95% of the acetic acid. The resultant bottoms were added to a 5 weight percent solution of sodium carbonate in varying proportions to effect precipitation of cobalt carbonate and the formation of water-soluble sodium salts of the aromatic acids present. The cobalt carbonate precipitate was then separated by filtration. The results were as indicated in Table II.

TABLE II

| | | | | | Cobalt Filtration and Precipitation | | | | | | |
|---|---|---|---|---|---|---|---|---|---|---|---|
| Run | | 1a | 1b | 2a | 2b | 3 | 4 | 5 | 6 | 7 | 8 |
| Feed | | A | A | A | A | A | A | B | B | B | B |
| Final Flash Temp. °C | | | | | | | | | | | |
| Bottoms | | 132 | 132 | 123 | 123 | 137 | 134 | 122.5 | 125.1 | 124 | 124.2 |
| Overhead | | 127 | 127 | 121 | 121 | 120 | 124 | 121.0 | 121.0 | 121 | 121.5 |
| Bottoms, g. | | | | | | | | | | | |
| HOAc (+H$_2$O) | (1) | 2.61 | 2.61 | 9.77 | 9.77 | 0.41 | 3.53 | 6.29 | 2.71 | 4.34 | 4.38 |
| | (2) | 3.49 | 3.49 | 3.62 | 3.62 | 4.55 | 4.88 | 4.76 | 5.45 | 4.60 | 5.45 |
| Co(OAc)2 | | | | | | | | | | | |
| BzA | (3) | 2.87 | 2.87 | 3.05 | 3.05 | 3.70 | 4.03 | 0.57 | 0.65 | 0.59 | 0.65 |
| OPA | (4) | 1.54 | 1.54 | 1.60 | 1.60 | 2.01 | 2.15 | 2.11 | 2.42 | 2.04 | 2.42 |
| MTA | (5) | 1.49 | 1.49 | 1.56 | 1.56 | 1.93 | 2.09 | 2.09 | 2.40 | 2.04 | 2.39 |
| IPA | (6) | 0.86 | 0.86 | 0.90 | 0.90 | 1.13 | 1.21 | 0.74 | 0.85 | 0.71 | 0.85 |
| TPA | (7) | 0.05 | 0.05 | 0.07 | 0.07 | 0.09 | 0.09 | 0.05 | 0.05 | 0.05 | 0.05 |
| 5% Na$_2$CO$_3$ Solution, g. | | 202.2 | 202.2 | 430.0 | 430.0 | 177.2 | 237.6 | 225.6 | 143.1 | 207.5 | 250.9 |
| Excess Na$_2$CO$_3$, % | | 29.8 | 29.8 | 49.7 | 49.7 | 18.1 | 9.9 | 0.35 | −20.5 | 10.1 | 19.7 |
| Slurry pH | | 7.2 | 7.2 | 7.1 | 7.1 | 7.0 | 6.7 | — | 7.1 | — | — |
| Temperature, °C. | | 75 | 100 | 75 | 100 | 100 | 100 | 100 | 100 | 100 | 100 |
| Time at Temp., Hrs. | | ~0(9) | 0.5 | ~0(9) | 0.5 | 0.5 | 0.5 | 0.5 | 0.1 | 0.1 | 0(9) |
| Cobalt Loss in Filtrate, % | | 1.77 | <0.13 | 3.47 | <0.28 | <0.08 | <0.12 | 0.0065 | 20.3 | 0.02 | 0.018 |
| Aromatic Acids in Precipitate, % | | 0 | 0 | 0 | 0 | 0 | 0 | Yes(8) | Yes(8) | 0 | 0 |

(1) Acetic Acid and Water;
(2) Cobalt Acetate;
(3) Benzoic Acid;
(4) Phthalic Acid;
(5) m-Toluic Acid;
(6) Isophthalic Acid;
(7) Terephthalic Acid;
(8) Yes. Indicates minor amounts which were not measured;
(9) Heated Na$_2$CO$_3$ to temperature indicated; added the bottoms and stirred and filtered immediately.

From Table II it may be seen that important variables in the precipitation are temperature and amount of sodium carbonate. Examples 1a and 2a illustrate that at temperatures of 75°C., significant losses of cobalt in the filtrate occur. It appears that at a temperature of 75°C. the CoCO3 is so finely divided that substantial amounts may pass even an extremely small-pore filter. At higher temperatures, the precipitate is apparently digested into an aggregate which is more readily removed by filtration. Even more substantial is the loss indicated in Example 6 when less than the stoichiometric amount of sodium carbonate is supplied. Examples 5 and 6 illustrate the advantage of using at least a stoichiometric amount of the carbonate to insure that the aromatic acids form the water-soluble sodium salts.

Cobalt carbonate was water washed and then added to acetic acid and water and heated until the carbonate reacted with the acetic acid to form cobalt acetate. The cobalt acetate-acetic acid solution was distilled to reduce the water content to 1 weight percent of the total, and proved to be an active catalyst for the oxidation of meta- and para-xylene to phthalic acids. The regeneration conditions and results appear in Table III.

TABLE III

| Cobalt Acetate Regeneration | | | | |
|---|---|---|---|---|
| Run | A | B | C | D |
| Feed, g. | | | | |
| CoCO$_3$ | 7.3 | 7.3 | 7.3 | 7.3 |
| HOAc | 500 | 500 | 500 | 500 |
| H$_2$O | 27.5 | 55.5 | 88.5 | — |
| Water in Feed, % (% of HOAc and H$_2$O | 5.2 | 10.0 | 15.0 | 0 |
| Regeneration Temperature, °C | 112 | 108 | 107 | 118 |

TABLE III-continued

| Cobalt Acetate Regeneration | | | | |
|---|---|---|---|---|
| Time at Temp., Hrs. | 0.8 | 0.5 | 0.3 | 0.4 |
| Cobalt Carbonate Reacted, % | 80.7 | 96.1 | 100 | 42.0 |

Table III indicates that at about 15% water in the acetic acid feed complete conversion of the cobalt to the acetate is obtained.

EXAMPLES 9 AND 10

A stripped filtrate from a xylene oxidation was added to a 20 percent stoichiometric excess of sodium carbonate in a 5 weight percent aqueous solution at 88°C. Precipitated cobalt carbonate was washed with 25 parts of water per part cobalt and was regenerated as active oxidation catalyst by reacting with acetic acid containing 15% water. The cobalt acetate recovered was combined with an increment of virgin cobalt acetate oxidation catalyst. The procedure is reported at Table IV.

TABLE IV

| Regeneration of Catalyst for Oxidation Demonstration Run | |
|---|---|
| Stripped Filtrate: | g. |
| HOAc (+H$_2$O | 435 |
| Co(OAc)$_2$ | 232.5 |
| MTA | 225.2 |
| BzA | 23.0 |
| OPA | 124.8 |
| IPA | 21.7 |
| TPA | 1.3 |
| | 1063.5 |
| Precipitation-Filtration: | |
| 5% Na$_2$CO$_3$ Solution, kg. | 17.20 |
| Precipitation Temperature, °C. | 88 |
| Water Wash, g. | 1940 |
| Excess Na$_2$CO$_3$, % | 20 |

TABLE IV-continued

| Regeneration of Catalyst for Oxidation Demonstration Run | |
|---|---|
| H₂O/Co Wash Ratio | 25 |
| Cobalt Losses, % | 0.009 |
| Regeneration: | |
| 85.0% HOAc, kg. | 12.50 |
| Co/HOAc Ratio | 0.0073 |
| Feed for Oxidation: | |
| Na in Feed, ppm | 113 |
| Regenerated Cobalt, % of Total Cobalt in Feed | 78.2 |
| Virgin Cobalt, % of Total Cobalt in Feed | 21.8 |

The catalyst formed as shown in Table II was utilized in a m-xylene oxidation as indicated in Table V.

TABLE V

| Catalyst Activity Study Demonstration of Cobalt Recovery Process | | |
|---|---|---|
| Run | 9 | 10 |
| Feed, Mole/Kg. | | |
| M'X (1) | 1.00 | 0.335 |
| MTA | — | 0.540 |
| H₂O | 0.679 | 1.518 |
| Cobalt | 0.098 | 0.099 |
| CH₃CHO | — | 0.164 |
| Product, Mole/Kg. | | |
| M'X | 0.335 | 0.013 |
| MTA | 0.563 | 0.381 |
| IPA | 0.062 | 0.468 |
| H₂O | 1.507 | 2.289 |
| Cobalt | 0.098 | 0.094 |
| Feed Rate, g./hr | 675 | 1109 |
| Product Rate, g./hr. | 687 | 1160 |
| Reactor Contents, g. | 1054 | 972 |
| Reaction Time, hr. | 1.56 | 0.88 |
| Reaction Temperature, °C | 121.5 | 121 |
| Pp O₂, psig. | 11.7 | 11.3 |
| Conversion, % | | |
| M'X → MTA | 65.9 | 96.0 |
| M'X → IPA | 6.3 | 55.9 |
| Cumulative (IPA) Conv., % | 6.3 | 58.7 |

(1) M'X = M-xylene.

Examples 9 and 10 illustrate the use of the regenerated cobalt acetate in a two-step oxidation of m-xylene. Example 9 shows the conversion of the xylene to m-toluic acid, while Example 10 relates the oxidation of the m-toluic acid to isophthalic acid in the presence of acetaldehyde, which serves as a promoter of the second stage oxidation. It is apparent that the regenerated cobalt acetate is a highly active catalyst for the oxidation reaction.

EXAMPLE 11

The cobalt regeneration of Examples 9 and 10 was repeated using a 5 weight percent aqueous solution of soda ash to precipitate the cobalt. The procedure is reported at Table VI and the constitution of the regenerated catalyst is shown in Table VII. The regenerated catalyst is equivalent in activity to the catalyst of Examples 9 and 10.

TABLE VI

| Conditions of Soda Ash Experiment | |
|---|---|
| Soda Ash Solution | |
| Concentration | 5% |
| Excess Used | 10% |
| Temperature During Precipitation | 194°F. |
| Cobalt Carbonate Slurry | |
| Temperature | 190°F. |
| Time at Temperature | 35 Min. |
| Cobalt Carbonate Filter Cake | |
| Amount H₂O for Wash | 887 g. |
| Ratio, H₂O/Co | 25/1 |
| Regenerated Catalyst | |
| Amount H₂O Used | 700 g. |
| Amount HOAc Used | 3300 g. |
| Temperature During Regeneration | 200°F. |
| Time at Temperature (does not include heat up time) | ½hr. |

TABLE VII

| Regenerated Catalyst Using Soda Ash | | |
|---|---|---|
| Regenerated Catalyst (Filtered) | .717% | Co(.755 duplicate) |
| | 24.4% | H₂O |
| | 0.1 | ppm Cl |
| | 5. | ppm S |
| | 2.0 | ppm Al |
| | 0.0 | ppm Ca |
| | 16.0 | ppm Na |
| | 3.7 | ppm Mg |
| | 100 | ppm Fe |
| | 20 | ppm Cr |
| | 18 | ppm Ni |
| | 29 | ppm Si |
| Filtrate from Cobalt Carbonate Separation | 4.0 | ppm Co |
| Impurities in Cobalt Recovery Feed | 100 | ppm Fe |
| | 25. | ppm Cr |
| | 20 | ppm Ni |
| Diamond Chemical Soda Ash | 70. | ppm Al |
| | 10 | ppm Ca |
| | 30 | ppm Mg |
| | 40 | ppm Si |
| | 540 | ppm Cl |
| | 28 | ppm S |

EXAMPLE 12

A solution of 99.9 g. cobalt acetate in 165 g. acetic acid at a temperature of 25°C. was added to 4324 g. of a 5 weight percent aqueous solution of sodium carbonate at a temperature of 88°C. The mixture was stirred on a hot plate for 15 minutes at about 88°C., filtered and the precipitate was washed with 700 g. of water. The washed precipitate (477 g.) was added to 2562 g. acetic acid at a temperature of about 96°C. as rapidly as possible. The washed precipitate contained about 10 weight percent cobalt carbonate calculated as CoCO₃, the balance essentially water. The acetic acid contained about 0.21 weight percent water. After the addition of the precipitate to the acetic acid, the temperature fell to about 80°C. A sample taken after about 7 minutes showed an essentially complete reaction to cobalt acetate. Samples taken after 12 minutes and 15 minutes appeared similar to the earlier sample. An inspection of the final product showed a slight amount of unreacted material demonstrated by a cloudy appearance. This material was easily removed by gravity filtration. No appreciable amount of solid was observed on the filter paper.

The invention claimed is:

1. In the method in which isophthalic acid is prepared in a reaction zone by the oxidation of meta xylene in a solvent containing a soluble cobalt catalyst, and in which method a stream of solvent containing dissolved catalyst is recirculated to the reaction zone after appropriate purification of the recirculated stream, the improvement which includes the steps of:

a. providing in the reaction zone acetic acid solvent and cobalt acetate catalyst and supplying to such reaction zone oxygen and meta xylene, said meta xylene containing a small amount of orthoxylene, oxidizing meta xylene to isophthalic acid and withdrawing a product stream comprising isophthalic acid, acetic acid, cobalt acetate, secondary products, contaminants comprising orthophthalic acid, organic acids, and other components;

b. separating isophthalic acid from said product stream to provide a depleted stream from which the isophthalic acid has been substantially completely depleted;

c. subjecting at least a portion of the depleted stream to flash distillation to strip therefrom a substantial portion of the acetic acid, water, and volatilizable components as an overhead stream and to provide a stream of stripped bottoms solution containing acetic acid, water, cobalt acetate, cobalt orthophthalate, orthophthalic acid, orher organic acids, and other components;

d. directing the stripped-bottoms stream to a precipitation zone for treatment for a period of about 0.5 hour or less at a temperature of at least about 75°C. with an aqueous solution containing about 5 weight per cent sodium carbonate, the final amount of sodium carbonate being at least 10% in excess of the stoichiometric amount necessary to react with all of the acid anions in the stripped bottoms solution to form a solution containing sodium acetate, sodium orthophthalate, other sodium salts, and other components, said solution containing a dispersion of a precipitate comprising cobalt carbonate, said precipitate being free from aromatic acids;

e. recovering the precipitate from the treated mixture by filtration to provide a filtrate containing all of the orthophthalic ion from the stripped bottoms solution and containing other components derived from the stripped bottoms solution;

f. washing the precipitate comprising cobalt carbonate with water to remove water soluble components comprising sodium salts;

g. transferring the washing precipitate to a catalyst regeneration zone in which the precipitate comprising cobalt carbonate is converted to catalytically active cobalt acetate by reaction of the precipitate with a stream of acetic acid, the thus prepared solution of cobalt acetate in acetic acid being completely free from catalytically poisonous quantities of orthophthalic acid;

h. preparing a solution of cobalt acetate in partially dried acetic acid suitable for recycling by removal of water from at least a portion of the depleted stream or streams derived from the depleted stream, said recycled solution of partially dried acetic acid containing all of the cobalt acetate of step (g); and i. charging the recirculated solution of catalytically active cobalt acetate in partially dried acetic acid to the reaction of step (a).

2. The method of claim 1 wherein the water and acetic acid supplied for reaction with the precipitate comprising cobalt carbonate is at least in part acetic acid derived from the overhead from the flash distillation step.

* * * * *